April 7, 1942.  C. M. SEARS  2,279,066
CONSTANT FLOW VALVE
Filed Dec. 5, 1940
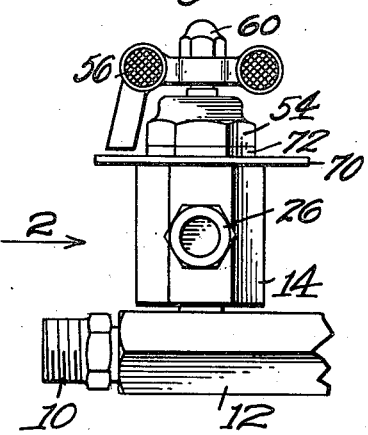
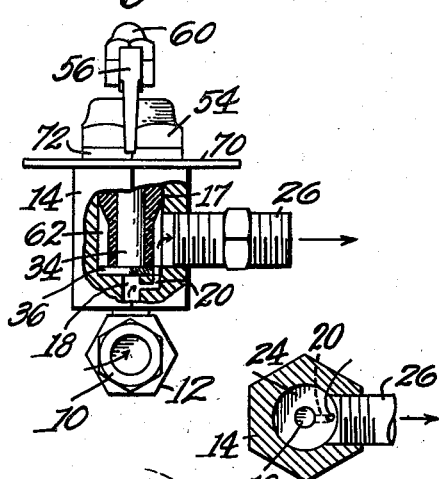
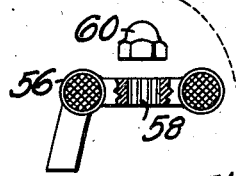
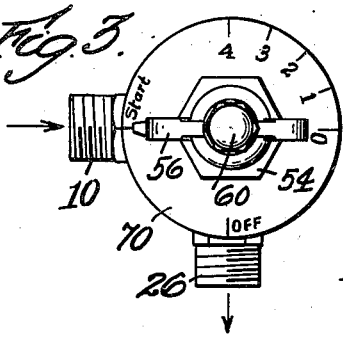
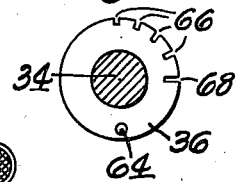
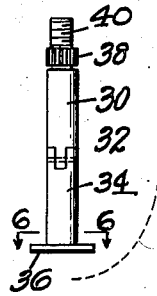
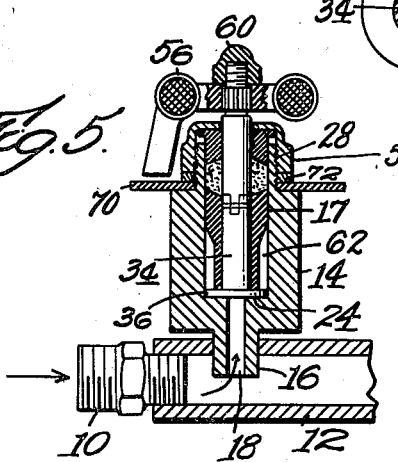
Inventor
Clarence M. Sears
by attorney
Charles R. Fay Patented Apr. 7, 1942

2,279,066

UNITED STATES PATENT OFFICE 2,279,066

CONSTANT FLOW VALVE

Clarence M. Sears, Ayer, Mass.

Application December 5, 1940, Serial No. 368,691

7 Claims. (Cl. 251—86)

This invention relates to valves particularly adapted for controlling the flow of fuel to oil burners, and the objects of the invention include the provision of a valve which is unaffected as to the amount of the fuel flow regardless of temperature changes; the provision of a valve in which the parts are so arranged as to admit or pass a constant oil flow for a particular setting under all conditions of temperature change; the provision of a valve in which temperature changes, while tending to expand or contract the metal valve parts, will not affect the degree of fuel flow; and the provision of a valve having a circularly slidable valve part which does not vary the fuel flow in spite of greatly changing temperature conditions.

Other objects and advantages of the invention will appear hereinafter.

Reference is to be had to the accompanying drawing, in which

Fig. 1 is a view in front elevation of a valve embodying the present invention;

Fig. 2 is a view in side elevation of the valve, looking in the direction of arrow 2 in Fig. 1, with parts in section;

Fig. 3 is a top plan view of the valve;

Fig. 4 is an exploded view of the valve parts;

Fig. 5 is a vertical sectional view thru the valve;

Fig. 6 is an enlarged section on line 6—6 of Fig. 4; and

Fig. 7 is a horizontal section thru the valve housing.

In the conventional fuel valve, temperature changes affect the metal parts so as to decrease the fuel flow upon a contraction of the parts during a downward change and to increase the flow upon an expansion during an upward change. This is particularly true of needle valves, as commonly used, and the ill effects are very noticeable and sometimes dangerous especially as the oil burner itself gives out more heat the greater the expansion of the valve parts and thus creates a vicious cycle.

In the drawing, the numeral 10 indicates a pipe fitting adapted for leading the fuel in the direction of the arrows in Fig. 5 from a reservoir into a supply pipe 12. The latter is bored in its top surface to receive a housing 14 by means of press fitting an integral teat 16 therein. The housing has a large hollow bore 17 which joins a reduced bore 18 leading from the hollow bore thru the teat and into the pipe 12. As seen in Figs. 2 and 7, a small bore 20 extends laterally from bore 18 and then turns upwardly to end as an aperture 22 in the bottom surface 24 of the bore 17. This surface provides a valve seat as explained below. A fitting 26 adjacent the aperture 22 is adapted for connection to the burner, and in normal course the fuel will pass up thru the teat 16 and out thru the fitting 26. The top of housing 14 is annularly recessed and threaded as at 28.

The movable valve part comprises a stem 30 having a pivotal joint 32 therein, which due to a desired slight looseness of the joint, will permit stem part 34 to have a small free floating movement with respect to the stem 30. A valve plate 36, circular in form and of a diameter to just circularly slidably fit in the large bore in the housing, is attached by any convenient means to the free end of stem part 34, or this plate may be integral with this stem part. At the opposite end of the stem from the plate 36, there is fixed a small pinion connection 38 and a screw threaded extension 40.

A sleeve bushing 42 having a reduced exterior portion 44 is adapted to fit over the stem, and this bushing is countersunk at 46 to receive a packing washer 48. A collar 50 is also countersunk to fit down on the washer, and this collar has a head 52 against which a cylindrical interiorly threaded nut 54 is adapted to bear. A manipulating handle 56 having vertical grooves 58 corresponding with the pinion connection 38 is adapted to engage the pinion to be thus prevented from relative rotation with respect to the stem 30, while a cap nut 60 holds the handle in place on the stem.

The stem, bushing, washer, collar, and nut 54 are assembled as shown in Fig. 5, and in the relation indicated in Fig. 4, and the handle 56 is located at the pinion. It will be seen that all parts but the handle are loose on the stem, but when it is inserted in the bore 17 of housing 14, the plate 36 seats on the bottom surface valve seat 24. A flat tight seating is insured by reason of the joint 32, but in some cases it is not necessary to use the joint as the parts may be very exactly machined. Nut 54 is now engaged with threads 28 on the housing 14 and by screwing down on this nut the parts will all be forced together depending on the pressure used. This results in a pressure being exerted on the stem so that plate 36 is tightly jammed against its seat, thus completely shutting off bore 18 in the teat, so that no oil can flow past the plate from bore 18 into gland 62 formed by the reduced portion 44 of the bushing and the interior walls of the housing.

The valve plate 36 is illustrated in detail in Fig. 6, wherein it will be seen that there is a round aperture 64 adjacent the periphery of the plate, and spaced from this aperture there is a series of slots 66 extending radially inwardly from the edge. These slots are all of the same width but regularly vary in length, the shortest being substantially diametrically opposite from aperture 64, and the lengths of the slots increase until the longest slot at 68 which is located about 90° from the aperture.

Apertures 22 and 64 are desirably of the same size, and will be aligned when handle 56 is set at "start" on dial 70, as shown in Fig. 3. This dial is separable from the housing 14 and may be clamped in any desired circumferential position thereon by a nut 72, for pre-setting to correct position.

In the operation of the device, the valve is turned to "start" position, wherein the apertures 22 and 64 are aligned. This allows full flow of fuel to the pipe 26 leading to the burner for initial ignition. When the flame is satisfactorily burning, the handle 56 may be turned clockwise in Fig. 3 until the pointer comes to station 4 at which point slot 68 will be aligned with aperture 22. This cuts down the fuel flow from starting position, but gives the largest flow desired under normal operation. Stations 3, 2, 1, 0, will give decreasing flows, as will be clear, because of the shorter slots 66 which cut down the fuel flow area. If desired, handle 56 may be turned counterclockwise in Fig. 3, to achieve the smallest flame first, so that from "start" position it is possible to set the valve at its greatest or least station without going thru the others.

Regardless of heat conditions, the plate 36 will always bear down tightly on its seat, and the expansion and contraction of the plate at no time will be sufficient to change the fuel flow areas, as distinguished from the needle valve in which the seat will recede from the needle under heat conditions and approach it under conditions of cold, to increase and decrease the fuel flow and thereby cause undesirable and dangerous variations in the burner flame.

Having thus described my invention and the advantages thereof, I do not wish to be limited to the details herein disclosed, otherwise than as set forth in the claims, but what I claim is:

1. In a valve, a housing, a passage in said housing, a rotatable valve stem in said housing, a substantially circular valve plate on said stem, a seat for said plate, said passage terminating in an orifice in said seat, and a slot in said plate, said orifice and slot being located at substantially the same radial distance from the axis of said valve stem, and said slot being open ended and extending inwardly from the periphery of said circular valve plate.

2. A valve as recited in claim 1 wherein said valve plate is provided with a series of open ended slots varying in area.

3. A valve as recited in claim 1 wherein said valve plate is provided with a series of radial slots, said slots being of different lengths.

4. A valve as recited in claim 1 wherein said valve plate is provided with a series of radial slots of varying areas, said orifice being in the path of said slots.

5. A valve as recited in claim 1 wherein said valve plate is provided with a series of radial slots of equal width and varying lengths.

6. A valve as recited in claim 1 wherein said stem is jointed to provide a floating action for seating said valve plate.

7. A valve as recited in claim 1 including means forming an aperture in said plate spaced from said slot, said aperture being of an area substantially equal to the area of the orifice, and said aperture being adapted to coincide with said orifice in a predetermined rotative position of said plate.

CLARENCE M. SEARS.